(12) United States Patent
Dewulf et al.

(10) Patent No.: US 7,745,024 B2
(45) Date of Patent: Jun. 29, 2010

(54) SEALED ACCUMULATOR EQUIPPED WITH A SAFETY DEVICE

(75) Inventors: Frederic Dewulf, Smarves (FR); Nicolas Vigier, Jaunay-Clan (FR)

(73) Assignee: SAFT, Bagnolet (FR)

( * ) Notice: Subject to any disclaimer, the term of this patent is extended or adjusted under 35 U.S.C. 154(b) by 1157 days.

(21) Appl. No.: 11/341,443

(22) Filed: Jan. 30, 2006

(65) Prior Publication Data
US 2006/0199046 A1 Sep. 7, 2006

(30) Foreign Application Priority Data
Feb. 1, 2005 (FR) ................................. 05 00982

(51) Int. Cl.
*H01M 10/48* (2006.01)
*H01M 2/34* (2006.01)
(52) U.S. Cl. ................................. 429/7; 429/61; 429/90
(58) Field of Classification Search ........................ None
See application file for complete search history.

(56) References Cited
U.S. PATENT DOCUMENTS
5,523,178 A 6/1996 Murakami et al.
6,232,011 B1 * 5/2001 Azema ........................ 429/61
6,248,470 B1 6/2001 Azema et al.
6,274,264 B1 8/2001 Azema
6,296,965 B1 * 10/2001 Azema ........................ 429/61
6,392,172 B1 5/2002 Azema
6,403,250 B1 6/2002 Azema et al.
2002/0098410 A1 * 7/2002 Leysieffer et al. ............. 429/61

FOREIGN PATENT DOCUMENTS
EP 1126534 A1 8/2001
FR 2756421 5/1998

* cited by examiner

*Primary Examiner*—John S Maples
(74) *Attorney, Agent, or Firm*—Sughrue Mion, PLLC

(57) ABSTRACT

A sealed accumulator (1) having an electrochemical bundle (9) including at least one positive electrode and one negative electrode arranged in a container (2); positive (6) and negative (7) current output terminals arranged on a cover (5) of the container and respectively connected to the positive and negative electrodes; a circuit-breaker including a connecting piece (10) and a membrane (20), electrically insulated from the connecting piece and suitable for deforming under the effect of an overpressure in the container, to break the connecting piece. The connecting piece extends over the top of the cover of the container and conducts an electric current between an electrode of one polarity and its current output terminal. The connecting piece is dimensioned to allow the passage of a current greater than 50 A.

27 Claims, 4 Drawing Sheets

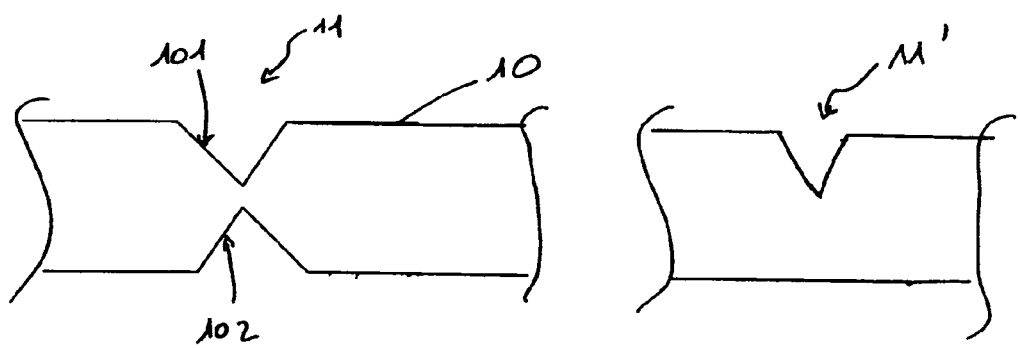
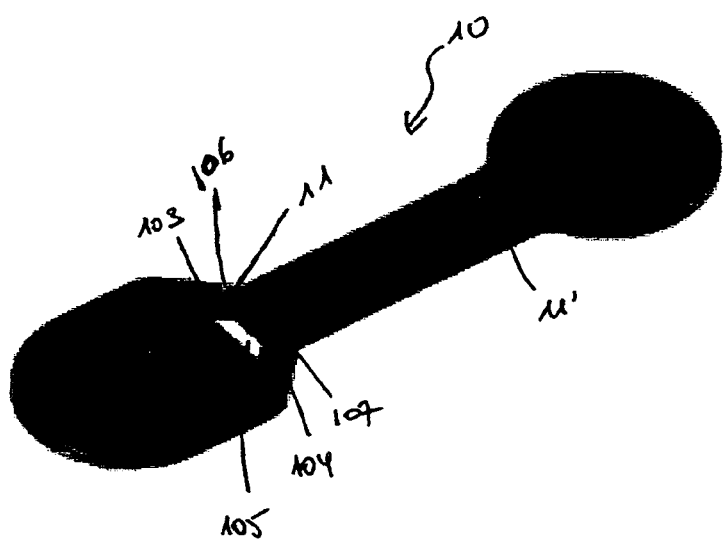

SEALED ACCUMULATOR EQUIPPED WITH A SAFETY DEVICE

FIELD OF THE INVENTION

The present invention relates to a sealed accumulator equipped with a circuit-breaker safety device.

A sealed accumulator or sealed electrochemical generator (as these two terms are equivalent, the term accumulator will be used in this description) comprises, in a manner known per se, an electrochemical bundle comprising alternating positive and negative electrodes framing separators impregnated with electrolyte. Each electrode is made up of a metal current collector supporting the electrochemically active material on at least one of its faces. The electrode is electrically connected to a current output which ensures electrical continuity between the electrode and the external application with which the accumulator is associated. The bundle of electrodes is arranged in a container which is sealed tight by a cover.

The invention relates to sealed accumulators of the nickel-cadmium, nickel-metal hydride or lithium-ion type. These accumulators can be of a cylindrical or rectangular format (also known as prismatic) or semi-prismatic (oblong).

An accumulator is generally designed to operate under what are called nominal conditions: i.e. in given ranges of temperature, current and voltage. The use of a sealed accumulator outside nominal conditions, as for example in the case of an accidental overload, a short-circuit, a temperature exceeding the maximum operating temperature, etc., creates a risk of explosion. Such situations result in a heating of the electrolyte and the formation of electrolyte vapours. The accumulation of these vapours in the container results in an increase in the internal pressure of the accumulator, which can lead to a violent bursting of the container and the spillage of chemical compounds which are harmful and corrosive to the environment and to persons nearby.

BACKGROUND OF THE INVENTION

Safety devices exist which prevent the accumulation of gases inside the container of a sealed accumulator and allow their evacuation when the internal pressure exceeds a pre-determined value.

The known safety devices are generally constituted by valves. Document U.S. Pat. No. 5,523,178 describes an accumulator valve. However, this valve has the drawback of being of complex design. When of simple design, valves have the disadvantage of opening only for high pressures, or opening for only a narrow range of pressures.

In addition, it is necessary for an accumulator safety device to also act as a circuit-breaker suitable for stopping the overload reaction quickly by interrupting the electric circuit in the accumulator. The circuit-breaker function also allows the appliances connected to the accumulator to be insulated electrically and irreversibly.

Document U.S. Pat. No. 6,274,264 describes an accumulator safety device comprising on the one hand a circuit-breaker intended to interrupt the electric path between an internal electrode connected to the electrochemical bundle and a current output terminal when the pressure in the accumulator exceeds a pre-determined threshold; and on the other hand a valve constituted by a cover portion having thinner sections, suitable for tearing when the pressure in the accumulator exceeds another pre-determined threshold higher than the first.

In addition, a safety device for an accumulator is known from the document U.S. Pat. No. 6,392,172, comprising a circuit-breaker integrated into a side wall of the container and suitable for interrupting the electric path between an internal electrode connected to the electrochemical bundle and a current output terminal when the pressure in the accumulator exceeds a pre-determined threshold.

Document FR-A-2,756,421 describes a circuit-breaker terminal which passes through the cover of an accumulator container. The circuit-breaker comprises a circular rupture component having weakened points on its periphery and welded at its centre to a membrane. In normal operation, the membrane with the rupture component ensures the electric continuity between the internal electrode and the current output terminal. In the event of malfunction and an increase in the pressure inside the accumulator container, the membrane abruptly deforms, taking with it the centre of the rupture component which breaks on its periphery between its weakened points. Electrical continuity is thus interrupted, but tightness preserved by the membrane.

The known circuit-breaker devices limit the passage of the current delivered by the accumulator to around 20 A due to a high internal resistance of the order of 0.5 to 2 mΩ. The circuit-breakers of the prior art are dimensioned to break or deform at a limit pressure value of the order of 7 to 10 bar, in order to fulfil their circuit-breaker function and interrupt the electric path. They must not therefore be too thick. Against this, they cannot conduct a large current, for example of the order of 50 A, for applications with high-power elements.

There is therefore a need for a sealed accumulator equipped with a circuit-breaker safety device which is of simple design and can be applied to large currents for high-power appliances.

SUMMARY OF THE INVENTION

To this end, the invention proposes a sealed accumulator comprising:
- an electrochemical bundle comprising at least one positive electrode and one negative electrode arranged in a container;
- positive and negative current output terminals arranged on a cover of the container and respectively connected to the positive and negative electrodes;
- a circuit-breaker comprising:
  - a connecting piece extending over the top of the cover of the container and suitable for conducting an electric current of between 30 A and 100 A between an electrode of one polarity and its current output terminal; and
  - a membrane, electrically insulated from the connecting piece and suitable for deforming under the effect of an overpressure in the container, the deformation of the membrane being suitable for breaking the connecting piece.

According to the embodiments, the accumulator according to the invention has one or more of the following characteristics:
- the connecting piece has at least one weakened point;
- the weakened point of the connecting piece is situated close to its point of connection with the current output terminal;
- the connecting piece has a section for passage of the current, between 2 $mm^2$ and 3 $mm^2$ width by thickness;
- the connecting piece extends between an intermediate terminal connected to an electrode of the electrochemical bundle and the current output terminal;
- the connecting piece has two weakened points, a first weakened point being shaped to ensure the rupture of the connecting piece, and a second weakened point being shaped to ensure a tilting of the broken connecting piece;

the first weakened point of the connecting piece comprises two symmetrical V-shaped weakened areas, situated respectively on each face of the connecting piece;

the first weakened point of the connecting piece comprises two lugs framing an opening made in the piece, two weakened areas extending respectively over each lug in two approximately perpendicular directions;

the connecting piece is of aluminium;

the membrane is of aluminium;

the membrane has a thickness comprised between 100 and 150 µm;

the membrane has a convex shape towards the inside of the container before operation of the circuit-breaker;

the membrane has a concave central deformation;

the membrane is suitable for deforming with an amplitude greater than or equal to 1.5 mm;

an insulating layer is provided between the membrane and the connecting piece, the insulating layer remaining whole when the connecting piece is broken by deformation of the membrane;

the membrane is situated in the thickness of the cover;

a protective cap covers the circuit-breaker;

the connecting piece is suitable for conducting an electric current between the negative electrode and the negative current output terminal or between the positive electrode and the positive current output terminal;

the accumulator is of cylindrical or prismatic format;

the membrane is suitable for deforming when the pressure inside the container exceeds 3 bar;

the connecting piece is suitable for breaking under the thrust force of the membrane when the pressure inside the container is between 5 and 9 bar;

the accumulator remains tight after the connecting piece has ruptured, when the pressure inside the container is between 5 bar and 9 bar;

the accumulator includes a safety cap which tears under the effect of an overpressure in the container comprised between 12 and 16 bar.

BRIEF DESCRIPTION OF THE DRAWINGS

Other characteristics and advantages of the invention will become apparent on reading the description below, given by way of example, and with reference to the figures, which show:

FIG. 3, a sectional diagrammatic view of an embodiment of a weakened point of the rupture component of the safety device according to the invention;

FIG. 4, a perspective diagrammatic view of another embodiment of a weakened point of the rupture component of the safety device according to the invention;

DETAILED DESCRIPTION

The sealed accumulator according to the invention comprises an electrochemical bundle comprising at least one positive electrode and a negative electrode arranged in a container; and output terminals for positive and negative current arranged on a cover of the container and connected respectively to the positive and negative electrodes. The accumulator also includes a circuit-breaker comprising a connecting piece and a membrane which is electrically isolated from the connecting piece and suitable for deforming under the effect of an overpressure in the container. The connecting piece extends over the top of the cover of the container and it is suitable for conducting an electric current between an electrode of one polarity and its current output terminal. The deformation of the membrane allows the connecting piece to be broken.

Should the internal pressure of the accumulator exceed a pre-determined threshold value, the deformation of the membrane allows the breaking of the connecting piece which assures the passage of the current, interrupting the electric conduction between the electrode of one polarity and its current output terminal.

The connecting piece is dimensioned to allow the passage of a relatively large current, of the order of 30 A to 50 A and possibly reaching 100 A, but can nevertheless break under the thrust of the membrane which exerts a concentrated force at the centre of the piece.

The invention will be described in a preferred embodiment, given by way of example.

Figure 1:
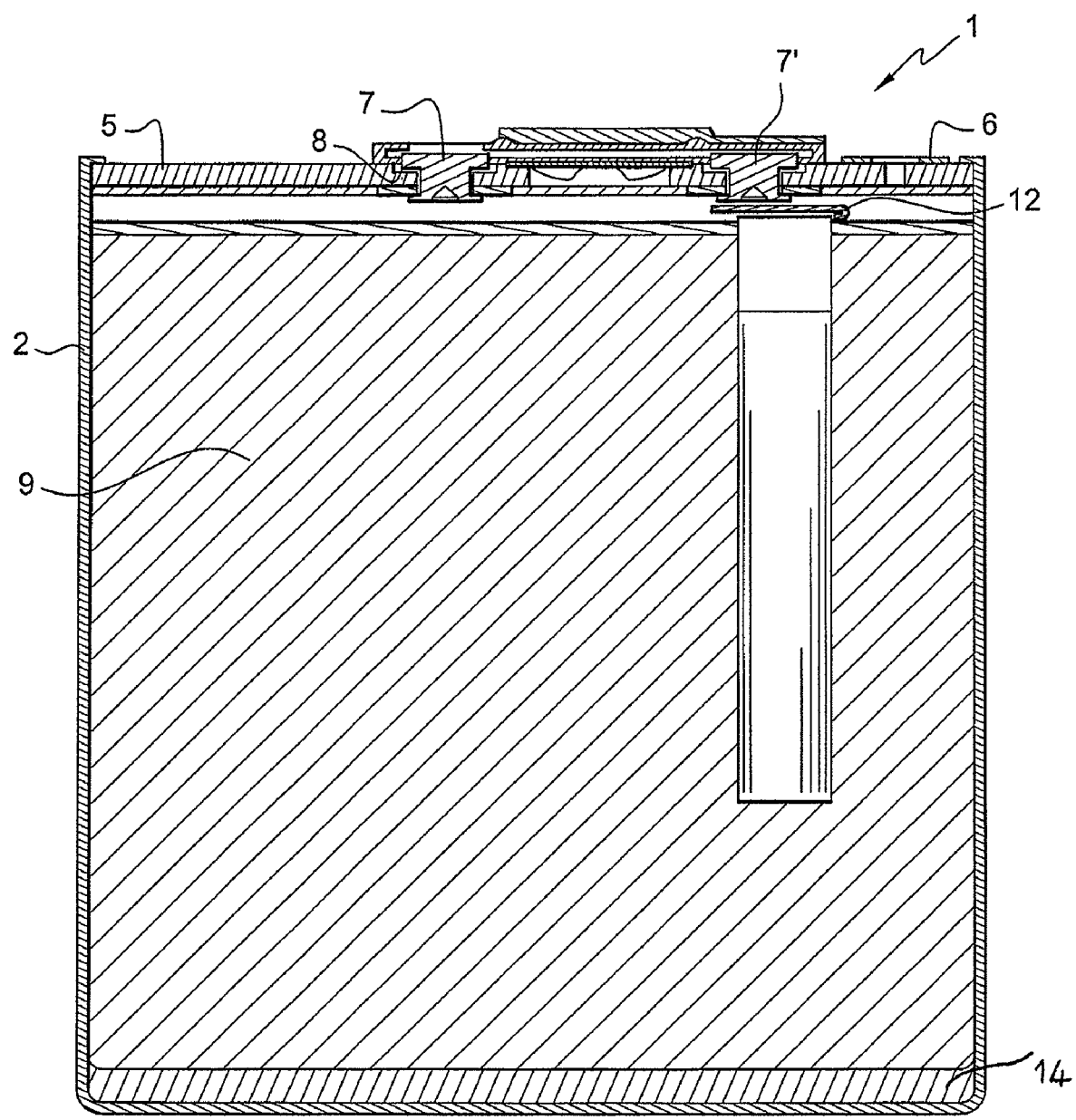
FIG. 1, a longitudinal sectional view of a sealed lithium-ion prismatic accumulator, equipped with a safety device according to the invention.

FIG. 1 shows in longitudinal section a sealed prismatic lithium-ion accumulator equipped with the safety device according to the invention.

The accumulator 1 comprises a container 2 with a cover 5 which supports the current output terminals 6 and 7. One of the current output terminals is welded onto the cover, and the other current output terminal passes through the cover. In the example illustrated, the container 2, with the cover 5, is at the positive pole and it is therefore the positive terminal 6 which is welded to the cover 5. The negative terminal 7 is fixed to the cover 5 by a screwed or crimped rivet which passes through the thickness of the cover. A gasket 8 electrically insulates the negative current output terminal 7 from the cover.

An electrochemical bundle 9, constituted by a winding of positive and negative electrodes and separators, is arranged in the container around a hollow axle which acts as a gas vent. The positive electrode is constituted by a current collector, which can be an aluminium strip, covered by active material constituted by a lithiated transition metal oxide such as $LiCoO_2$, $LiNiO_2$, $LiMnO_2$, $LiMn_2O_4$, or a mixture of these. The negative electrode is constituted by a current collector, which can be a copper strip, covered by an active material constituted by a substance capable of reversibly inserting lithium, such as graphite, coke, vitreous carbon and carbon black. The separator may be of polyolefin. At least one positive electrode, at least one separator, and at least one negative electrode are superposed to form the electrochemical bundle 9, and the electrochemical bundle is wound around the hollow axle.

A plane connection connects the positive electrode of the bundle to one wall of the container, the walls of the container being electrically conductive with the cover which is connected to the positive current output terminal 6. Another plane connection 12 connects the negative electrode of the bundle to an intermediate terminal 7' electrically connected to the negative current output terminal 7. A gasket 8' electrically insulates the intermediate negative terminal 7' from the cover 5. The positive and negative electrodes can be welded to their plane connection. A plane connection is preferable, but any other type of connection can be conceivable.

A gasket 14 is placed between the electrochemical bundle and the base of the container. It is constituted by a heatresistant, chemically stable material also acting as an electrical insulator in order to prevent an electric contact between the edge of a negative electrode of the bundle and the wall of the container connected to the positive terminal, which could cause a short-circuit.

According to the invention, a circuit-breaker device is arranged between the negative electrode of the electrochemical bundle and the negative current output terminal 7. More specifically, the circuit-breaker device is arranged between the intermediate terminal 7' and the negative current output terminal 7. A gasket 8' electrically insulates the intermediate terminal 7' from the cover.

Figure 2A:
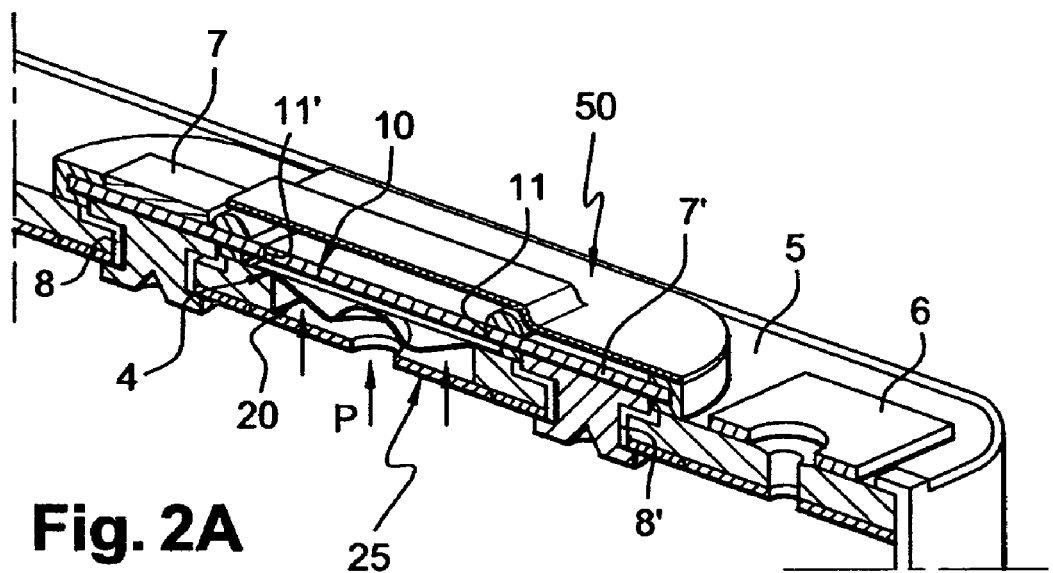
FIGS. 2A and 2B respectively a diagrammatic perspective side view of the safety device according to the invention, respectively before rupture and after rupture.
Figure 2B:
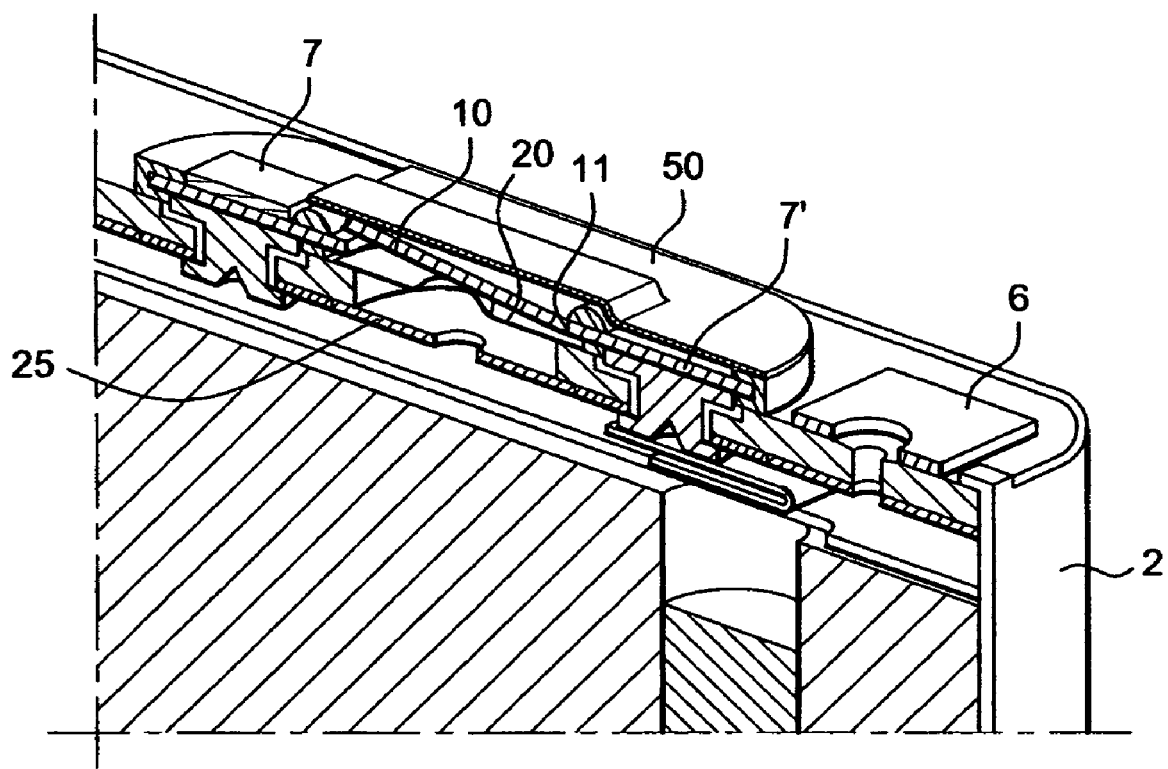

FIGS. 2A and 2B illustrate the circuit-breaker device in detail.

The circuit-breaker device comprises an electrically conductive connecting piece 10, for conducting an electric current between the negative electrode and the negative output terminal 7, and a membrane 20 suitable for deforming and breaking the connecting piece 10 so as to irreversibly interrupt the passage of the current. In particular, the membrane 20 is suitable for deforming under the effect of an overpressure in the container 2, illustrated by the arrows P on FIG. 2A.

The connecting piece 10 has the general shape of a rigid rectangular plate of a thickness around 0.6 mm and width of 3.3 mm, with a length depending on the distance between the intermediate terminal 7' and the negative current output terminal 7. The connecting piece 10 thus has a section of 2 mm$^2$, allowing the passage of a relatively large current, in particular greater than 50 A for high-power appliance applications.

The connecting piece 10 can be fixed at one of its ends to the intermediate terminal 7' passing through the cover 5 of the container to connect the negative electrode of the electrochemical bundle, and at its other end to the negative current output terminal 7. The connecting piece 10 therefore extends on the outside of the container 2, above the cover 5 supporting the current output terminals 6 and 7. The ends of the connecting piece may be fixed to terminals 7, 7' by riveting or by laser welding. The risk of a short-circuit between the connecting piece 10, electrically connected to negative terminal 7, and the cover 5, electrically connected to the positive terminal 6, will be avoided by fixing the connecting piece 10 on the top of the terminals 7 and 7'. An insulating layer 4 is also provided, which will be described below.

The connecting piece 10 is of aluminium. Other conductive materials can be considered for the connecting piece, such as copper or nickel for example, but aluminium is preferred for reasons of laser welding assembly technology with copper, nickel-copper or nickel terminals. In addition, aluminium has mechanical characteristics favourable to a clean rupture under the thrust force of the membrane 20, as will be explained below.

The connecting piece 10 has at least one weakened point 11 which allows the connecting piece to break under the force of the deformed membrane 20 (FIG. 2B). The characteristics of the pair constituted by the connecting piece and membrane are chosen to allow the deformation of the membrane and the rupture of the connecting piece for a pressure range of 5 to 9 bar, the pressure in the container in normal operation being under 2 bar.

In the embodiment illustrated, the connecting piece 10 has two weakened points 11, 11', situated close to the current output terminal 7 and the intermediate terminal 7'. A single weakened point could be sufficient however, on one of the ends or in the centre of the piece. These weakened points may be constituted by notches in the thickness of the rupture plate 10, extending preferably over the whole width of the plate. The weakening notches 11 must be deep enough to guarantee the rupture of the connecting piece 10 without at the same time introducing too great an internal resistance, which would prevent the conduction of a large current. In this respect, a plate which has a section of 2 to 3 mm$^2$ will be selected for the connecting piece, with a width considerably greater than its thickness, in order that the conductive section of the plate is only slightly changed by the weakening notches 11. The connecting piece 10 can thus conduct a current which can reach 100 A, the upper limit depending on the duration of the electric pulse.

The following table lists the characteristics of the cover containing a circuit-breaker according to the invention. This table clearly illustrates that the connecting piece 10 is suitable for conducting a relatively large current without causing too great an increase in temperature on the cover 5.

| Action | Amperage passing through the connecting piece | Temperature difference measured on the cover |
| --- | --- | --- |
| Constant demand for current | 2 A for 6 hours | <10° C. |
|  | 4 A for 3 hours | <10° C. |
|  | 15 A for 1 hour | <15° C. |
| High power usage | 30 A for 20 min | <20° C. |
|  | 50 A for 6 min | <40° C. |
| Current peak | 60 A for 10 sec/stop 20 sec; 5 cycles | <30° C. |
|  | 80 A for 5 sec/stop 20 sec; 5 cycles | <50° C. |
| Cycle ageing | 50 A for 5 min/stop 20 min; 1000 cycles; bench test at Tn | <60° C. |
|  | 50 A for 5 min/stop 20 min; 500 cycles; adiabatic test | <80° C. |

A membrane 20 is also placed under the connecting piece 10. The membrane 20 is not of the same shape as the connecting piece, but it covers the whole of the connecting piece, i.e. its surface is larger than that of the plate of the connecting piece. In particular, the membrane may have a approximately circular shape, or any other suitable shape, such as rectangular for example, the plate of the connecting piece extending above the surface of the membrane.

The membrane 20 is shaped as a dome convex towards the inside of the container 2. The membrane 20 is thus well distant from the connecting piece 10 in normal operation of the accumulator. The membrane 20 can have a concave central deformation, i.e. turned towards the connecting piece 10. This central deformation constitutes a sort of push-button against the connecting piece 10 when the membrane reverses under the effect of the pressure P inside the container 2. The form and dimensions of the dome of the membrane 20 are such that the amplitude of the deformation of the membrane exceeds 1.5 mm when it reverses under the effect of an overpressure in the container 2 (change from FIG. 2A to FIG. 2B).

The membrane 20 is positioned inside the container 2, i.e. under the cover 5, in order to be able to be subject to the pressure of the gases caused by a malfunction of the accumulator. The membrane 20 can be constituted by a localized thinning of the cover 5 or by a foil attached to an opening provided in the cover 5. According to the embodiment illustrated, the membrane 20 is welded onto the periphery of an opening worked in the cover 5.

The membrane 20 is preferably of aluminium and has a very small thickness, for example between 100 and 150 μm, preferably 125 μm as annealed aluminium. A membrane as thin as this can be produced as it is not intended to conduct an electric current as is the case in the circuit-breaker terminal of document FRA-A-2 756 421. Nevertheless the shape of the membrane 20, in spite of its small thickness, allows a force of around 20N to be exerted on the connecting piece 10 when it reverses.

The choice to make the membrane of aluminium is for reasons of welding compatibility with the material of the cover 5. The cover 5 is of aluminium when the container and the cover are at the positive pole of the accumulator. In addition, the membrane must be compatible with the electrolyte in the container, and must remain tight. The membrane 20 is in contact with the inside of the container and is subject to electrolyte vapours when the accumulator is operating. These discharges must not create electrical malfunctions. It is therefore preferable for the membrane to be constituted by the same material as the container and the cover since, before the circuit-breaker device operates, it is of the same polarity as the cover, i.e. at the positive pole. An insulating shim 25 can be provided, placed under the membrane 20 to limit the risks of short-circuit between the plane negative polarity connection 12 and the membrane 20. This shim 25 has a central opening to allow the passage of the gases emitted by the electrolyte and thus allow the reversal of the membrane 20 in the event of overpressure in the container.

During operation of the circuit-breaker, when the membrane 20 forces the connecting piece 10 to break, it is necessary to avoid any risk of contact between the connecting piece 10 electrically connected to the negative terminal 7 and the reversed membrane 20 connected to the cover 5, i.e. electrically connected to the positive terminal 6. An insulating layer 4 is therefore provided between the membrane 20 and the connecting piece 10. This insulating layer 4 can be a coating layer, such as an insulating adhesive applied to the side of the membrane facing the connecting piece, or a flexible plastic layer interposed between the membrane 20 and the connecting plate 10.

The nature of the insulating layer 4, in contact with the connecting piece before operation of the circuit-breaker, is chosen to be able to withstand the increases in temperature resulting from the passage of the high-intensity current in the connecting piece 10, in particular a current of the order of 50 A and possibly reaching 80 A in pulsed operation of the accumulator. In addition, the insulating layer must have mechanical characteristics elastic enough to not contain the deformation of the membrane 20 and not block the force which the latter exerts on the connecting piece 10. The insulating layer 4 can be of PVC (polyvinyl chloride), and preserves its insulating characteristics over a temperature range of −40 to +120° C. In particular, the insulating layer 4 remains whole after operation of the circuit-breaker, i.e. it is not torn by the reversal of the membrane 20, so as to maintain an electrical insulation between the reversed membrane 20 and the broken connecting piece 10.

In order to avoid any risk of deterioration of the circuit-breaker, a protective cap 50 can cover the connecting piece 10, in particular the weakened points 11, 11' of the connecting piece. As the connecting piece is placed on the top of the cover, there is a risk of failure or premature rupture of the connecting piece in the event of contact with this piece.

The operation of the safety device is now described.

In normal operation (FIG. 2A), the accumulator supplies a current to an appliance via its positive and negative output terminals 6 and 7. The connecting piece 10 is placed on the electric path between the negative electrode of the electrochemical bundle and the negative output terminal 7. The connecting piece 10 is not subject to any particular force and allows the passage of a strong current.

In the event of accumulator overload, due to an exceeding of charge or any other electrical malfunction, gases are produced by a heating of the electrolyte and the pressure in the accumulator container increases. The overpressure inside the container then exerts a force on the membrane 20 (arrows in FIG. 2A), resulting in its reversal (FIG. 2B). The membrane 20 was designed to reverse when the pressure inside the container exceeds 3 bar. When the pressure in the container continues to increase, the reversed membrane swells and the button of the membrane exerts a force on the connecting piece 10. When the pressure inside the container reaches 7 bar ±2, the force exerted on the connecting piece by the membrane results in the rupture of said connecting piece due to fatigue of the piece.

Alternatively, the reversal of the membrane can also be abrupt when the pressure inside the container reaches 7 bar ±2. The periphery of the membrane 20 is firmly fixed, by welding, to the cover, and the convexity of the membrane towards the inside of the container may be designed to deform suddenly into concavity relative to the inside of the container. This abrupt deformation causes the button of the membrane 20 to exert a strong punctiform pressure on the connecting piece. This force can reach 20 N. At least one of the weakened points 11, 11' of the connecting piece is chosen to break under the effect of such a force. The connecting piece 10 therefore breaks irreversibly and thereby interrupts the conduction of the current to the negative output terminal of the accumulator. The appliance to which the accumulator is connected is then electrically insulated from the accumulator and the electrolysis reactions in the accumulator are immediately halted in the absence of load shift.

When the connecting piece 10 breaks, it is insulated from the cover 5 by the insulating layer 4 separating it from the membrane 20. It is sought to ensure an insulation of the connecting piece 10 vis-à-vis the cover 5, after operation of the device, of more than 100 MΩ at 50 V.

The thrust of the membrane 20 against the broken connecting piece 10 allows the broken end of the connecting piece to be moved well away from its point of electrical connection with one or other of the terminals 7, 7'. The broken end of the connecting piece thus shifts by at least 1 mm relative to its fixing point on a negative terminal 7, 7' in order to avoid the appearance of an electric arc between the terminal and the broken end. In this respect, one or more weakened points situated close to the terminals is to be preferred, rather than one central weakened point which will result in a rupture of the connecting piece with a smaller distance between the broken ends.

According to an embodiment, the two weakened points 11, 11' of the connecting piece 10 are not identical. A first weakened point 11 may be shaped to ensure the rupture of the connecting piece and a second weakened point 11' may be shaped to ensure the tilting of the broken connecting piece under the thrust of the membrane 20. The relative positions of the connecting piece 10 and the membrane 20 may thus be adjusted to ensure a good transmission of the force of the membrane 20 to break the piece and an adequate shift of the broken end of the connecting piece.

According to the embodiment illustrated in FIG. 3, a first rupture weak point 11 comprises two symmetrical V-shaped notches 101, 102, situated on either side, on each face of the connecting piece 10. The second weakened point 11' will then have a single notch allowing pivoting of the connecting piece in order to facilitate distancing between the broken end of the connecting piece and the fixing terminal.

According to the embodiment illustrated in FIG. 4, a first rupture weak point 11 comprises two lugs 103, 104 framing an opening 105 made in the piece 10. Two weakened areas 106, 107 extend over each lug and form an angle more or less equal to 90°. The weakened points of each lug 103, 104 can have two V-shaped notches as illustrated in FIG. 3.

The rupture weak points 11 described with reference to FIGS. 3 and 4 allow a good compromise between a section of the piece 10 allowing the passage of a large current and a section small enough to guarantee the rupture of the piece at the required pressure ranges.

Figure 5:
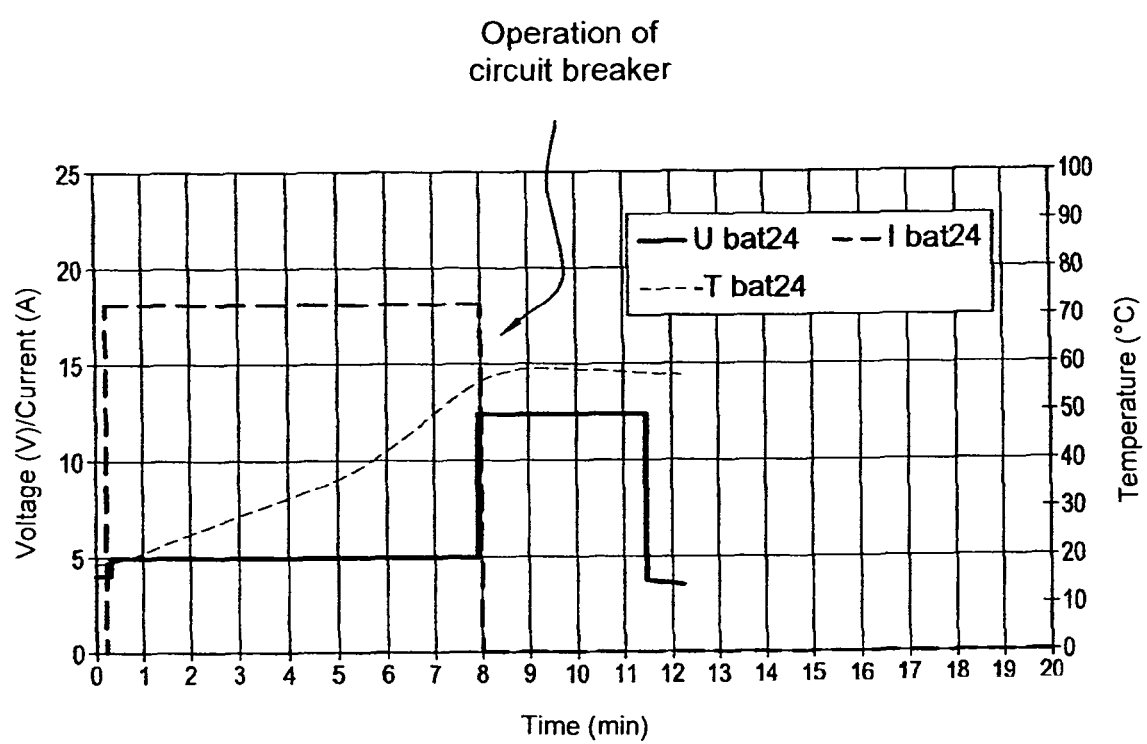
FIG. 5, a graph illustrating the operation of the circuit-breaker device according to the invention.

The graph of FIG. 5 shows the operation of an accumulator according to the invention, of the aluminium type container, delivering a capacity of 6 Ah.

At the start of the graph, the accumulator is fully charged to 4.1 V. The accumulator is then overcharged at a voltage of 12 V with a supply current of 18 A.

An 18 A current (light line) flows through the connecting piece 10 and the accumulator delivers an overload voltage (heavy line) of approximately 5 V. The temperature (dotted line) of the casing increases progressively from 20° C. to approximately 60° C.

At the end of about 8 min of overload, the circuit-breaker operates, as the pressure of the gases inside the container has exceeded the threshold of 7 bar ±2. The current (fine line) drops abruptly. The passage of the current is immediately and irreversibly interrupted by the rupture of the connecting piece 10. The temperature (dotted line) stabilizes and the voltage (heavy line) presents an overvoltage peak due to the short-circuit before dropping below the charging voltage of the accumulator.

The graph of FIG. 5 clearly shows the clean and irreversible break caused by the circuit-breaker according to the invention and shows that the increase in the temperature is controlled before the operating threshold of the circuit-breaker.

The accumulator equipped with the circuit breaker according to the invention presents numerous advantages.

The safety device according to the invention presents the advantage of not reducing the current density flowing between the electrochemical bundle and the current output terminal. The thickness of the weakened points of the connecting piece is a compromise between the largest possible section, allowing the passage of the current, and a section small enough to allow the rupture of the piece. The internal resistance of the connecting piece 10 is below 300 μΩ, and this value can be guaranteed for the whole duration of the accumulator life, i.e. more than 1000 cycles.

The safety device is therefore well suited to high-power applications, such as hybrid vehicles, portable tools or backup support for telecommunications networks for example, in which high current densities are used.

Another advantage of the invention resides in the fact that the electrochemical bundle is kept in the container in the event of sudden rupture of the security device, as the membrane 20 prevents the ejection of the electrochemical bundle and the leakage of electrolyte. The risks of spillages of dangerous chemical products are thus limited.

The circuit-breaker safety device according to the invention is designed to function over a pressure range of 5 to 9 bar, whereas a safety cap traditionally functions at a higher pressure range, between 12 and 16 bar, and the container welds are designed to withstand a pressure of approximately 20 bar. When the circuit-breaker according to the invention is activated, i.e. when the connecting piece has been broken, the generation of electrolyte vapours quickly ceases and the first limit of 12 bar cannot therefore be reached. The tightness of the container according to the invention is therefore guaranteed without risk of explosion of the container. The container does, however, have a safety cap, activated in the case of excessive malfunction. The safety cap can be of any type known per se, and can be a component mounted on, or integrated into, the cover or the container.

The safety device according to the invention also presents the advantage of reduced bulk, being integrated into the thickness of the cover of the container.

The present embodiment and the figures must be seen as having been presented by way of illustration and non-limitatively, and the invention as not being limited to the details supplied here, but capable of modification while remaining within the framework of the scope of the attached claims.

In particular, the circuit-breaker device may be placed on the electric path between the positive electrode and the positive current output terminal, rather than between the negative electrode and the negative current output terminal, the container then being at the negative pole. Similarly, although the attached figures refer to a prismatic accumulator, the safety device of the invention is perfectly adaptable to a cylindrical accumulator.

Also, the numerical values given with reference to the connecting piece 10 and/or the membrane 20 do not limit the scope of the invention. These values may be amended so as to be suited to different pressure or current values.

The invention claimed is:

1. Sealed accumulator comprising:
an electrochemical bundle comprising at least one positive electrode and one negative electrode arranged in a container;
positive and negative current output terminals arranged on a cover of the container and respectively connected to the positive and negative electrodes;
a circuit-breaker comprising:
a connecting piece extending over the top of the cover of the container and suitable for conducting an electrical current of between 30 A and 100 A between an electrode of one polarity and its current output terminal; and
a membrane, electrically insulated from the connecting piece and suitable for deforming under the effect of an overpressure in the container, the deformation of the membrane being suitable for breaking the connecting piece.

2. Sealed accumulator according to claim 1, wherein the connecting piece has at least one weakened point.

3. Sealed accumulator according to claim 2, wherein the weakened point of the connecting piece is situated close to its point of connection with the current output terminal.

4. Accumulator according to claim 1, wherein the connecting piece has a general shape of a rigid rectangular plate and a section for passage of the current having a cross-sectional area of between 2 mm$^2$ and 3 mm$^2$.

5. Sealed accumulator according to claim 1, wherein the connecting piece extends between an intermediate terminal connected to an electrode of the electrochemical bundle and the current output terminal.

6. Sealed accumulator according to claim 5, wherein the connecting piece has two weakened points, a first weakened point being shaped to ensure the rupture of the connecting piece and a second weakened point being shaped to ensure a tilting of the broken connecting piece.

7. Sealed accumulator according to claim 6, wherein the first weakened point of the connecting piece comprises two symmetrical V-shaped weakened areas situated respectively on each face of the connecting piece.

8. Sealed accumulator according to claim 5, wherein the connecting piece has two weakened points, a first weakened point of the connecting piece comprises two lugs framing an opening made in the piece, with the two weakened points extending respectively over each lug in two substantially perpendicular directions.

9. Sealed accumulator according to claim 1, wherein the connecting piece is of aluminium.

10. Sealed accumulator according to claim 1, wherein the membrane is of aluminium.

11. Sealed accumulator according to claim 1, wherein the membrane has a thickness of between 100 and 150 μm.

12. Sealed accumulator according to claim 1, wherein the membrane has a convex shape towards the inside of the container before the circuit-breaker has operated.

13. Sealed accumulator according to claim 12, wherein the membrane has a central concave deformation.

14. Sealed accumulator according to claim 1, wherein the membrane is suitable for deforming with an amplitude greater than or equal to 1.5 mm.

15. Sealed accumulator according to claim 1, wherein an insulating layer is provided between the membrane and the connecting piece, the insulating layer remaining whole when the connecting piece is broken by deformation of the membrane.

16. Sealed accumulator according to claim 1, wherein the membrane is situated in the thickness of the cover.

17. Sealed accumulator according to claim 1, wherein a protective cap covers the circuit-breaker.

18. Sealed accumulator according to claim 1, wherein the connecting piece is suitable for conducting an electric current between the negative electrode and the negative current output terminal.

19. Sealed accumulator according to claim 1, wherein the connecting piece is suitable for conducting an electric current between the positive electrode and the positive current output terminal.

20. Sealed accumulator according to claim 1, of cylindrical format.

21. Sealed accumulator according to claim 1, of prismatic format.

22. Sealed accumulator according to claim 1, wherein the membrane is suitable for deforming when the pressure in the container exceeds 3 bar.

23. Sealed accumulator according to claim 1, wherein the connecting piece is designed to break under the thrust force of the membrane when the pressure inside the container is between 5 and 9 bar.

24. Sealed accumulator according to claims 1, wherein remains tight after the connecting piece has ruptured, when the pressure inside the container is between 5 and 9 bar.

25. Sealed accumulator according to claim 1, including a safety cap which tears under the effect of an overpressure in the container of between 12 and 16 bar.

26. Sealed accumulator comprising:
an electrochemical bundle comprising at least one positive electrode and one negative electrode arranged in a container;
positive and negative current output terminals arranged on a cover of the container and respectively connected to the positive and negative electrodes;
a circuit-breaker comprising:
a connecting piece extending over the top of the cover of the container and suitable for conducting an electrical current of between 30 and 100 A between an electrode of one polarity and its current output terminal; and
a membrane, electrically insulated from the connecting piece and suitable for deforming under the effect of an overpressure in the container, the deformation of the membrane being suitable for breaking the connecting piece;
wherein the connecting piece has two weakened points, a first weakened point being shaped to ensure the rupture of the connecting piece and a second weakened point being shaped to ensure a tilting of the broken connecting piece, the first weakened point of the connecting piece comprising two symmetrical V-shaped weakened areas situated respectively on each face of the connecting piece.

27. Sealed accumulator comprising:
an electrochemical bundle comprising at least one positive electrode and one negative electrode arranged in a container;
positive and negative current output terminals arranged on a cover of the container and respectively connected to the positive and negative electrodes;
a circuit-breaker comprising:
a connecting piece extending over the top of the cover of the container and suitable for conducting an electrical current of between 30 and 100 A between an electrode of one polarity and its current output terminal; and
a membrane, electrically insulated from the connecting piece and suitable for deforming under the effect of an overpressure in the container, the deformation of the membrane being suitable for breaking the connecting piece;
wherein the connecting piece has a general shape of a rigid rectangular plate and a section for passage of the current having a cross-sectional area of between 2 mm$^2$ and 3 mm$^2$.

* * * * *